(12) United States Patent
Ahmed-Zaid et al.

(10) Patent No.: US 6,968,266 B2
(45) Date of Patent: Nov. 22, 2005

(54) OBJECT DETECTION IN ADAPTIVE CRUISE CONTROL

(75) Inventors: Farid Ahmed-Zaid, Saline, MI (US); Gerald H Engelman, Plymouth, MI (US); Paul Robert Haney, Coventry (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/063,498

(22) Filed: Apr. 30, 2002

(65) Prior Publication Data

US 2003/0204298 A1  Oct. 30, 2003

(51) Int. Cl.⁷ .......................... G06F 7/00; G06F 17/00
(52) U.S. Cl. .................... 701/96; 701/93; 701/36; 701/38; 701/65; 701/91; 701/200; 340/901; 280/5.507; 280/5.513
(58) Field of Search ................ 701/96, 93, 1, 701/36, 38, 65, 71, 72, 79, 82, 90, 91, 200; 340/901; 280/5.507, 5.513

(56) References Cited

U.S. PATENT DOCUMENTS

| | | | | |
|---|---|---|---|---|
| 4,552,239 A | * | 11/1985 | Kanazawa et al. | 180/408 |
| 4,670,845 A | | 6/1987 | Etoh | |
| 5,333,058 A | * | 7/1994 | Shiraishi et al. | 701/72 |
| 5,485,161 A | | 1/1996 | Vaughn | |
| 5,505,532 A | * | 4/1996 | Tozu et al. | 303/198 |
| 5,710,565 A | * | 1/1998 | Shirai et al. | 342/70 |
| 5,745,870 A | | 4/1998 | Yamamoto et al. | |
| 5,771,007 A | | 6/1998 | Arai et al. | |
| 5,902,345 A | * | 5/1999 | Minowa et al. | 701/96 |
| 5,977,869 A | | 11/1999 | Andreas | |
| 6,024,381 A | * | 2/2000 | Mottola | 280/767 |
| 6,127,964 A | * | 10/2000 | Kageyama | 342/70 |
| 6,163,755 A | * | 12/2000 | Peer et al. | 701/301 |
| 6,185,496 B1 | * | 2/2001 | Matsuno | 701/70 |
| 6,199,001 B1 | * | 3/2001 | Ohta et al. | 701/51 |
| 6,212,465 B1 | * | 4/2001 | Sielagoski et al. | 701/96 |
| 6,233,515 B1 | * | 5/2001 | Engelman et al. | 701/96 |
| 6,246,932 B1 | * | 6/2001 | Kageyama et al. | 701/24 |
| 6,317,679 B2 | * | 11/2001 | Sielagoski et al. | 701/96 |
| 6,381,524 B1 | * | 4/2002 | Kuragaki et al. | 701/36 |
| 6,400,405 B2 | * | 6/2002 | Tomida et al. | 348/333.05 |
| 6,408,241 B1 | * | 6/2002 | Sielagoski et al. | 701/96 |
| 6,505,107 B2 | * | 1/2003 | Kuragaki et al. | 701/36 |
| 6,526,352 B1 | * | 2/2003 | Breed et al. | 701/213 |

* cited by examiner

*Primary Examiner*—Olga Hernandez
(74) *Attorney, Agent, or Firm*—Jennifer M. Stec; Artz & Artz

(57) ABSTRACT

A control system 20 for an automotive vehicle 22, such as an adaptive cruise control (ACC) system, is provided including a controller 24. The controller 24 is electrically coupled to a radar system and a navigation system. The detection system 28 detects an object and generates an object profile. The navigation system 34 generates a navigation signal. The controller 24 in response to the object profile and the navigation signal, generates a predicted future path profile and inhibits resume speed of the vehicle 22 in response to the predicted future path profile. An additional feature of the invention is that the controller 24 may also be electrically coupled to a yaw rate sensor 30. The yaw rate sensor 30 senses the yaw rate of the vehicle 22 and generates a yaw rate signal. The controller 24 in response to the yaw rate signal inhibits resume speed of the vehicle 22.

18 Claims, 3 Drawing Sheets

OBJECT DETECTION IN ADAPTIVE CRUISE CONTROL

CROSS REFERENCE TO RELATED APPLICATIONS

The present invention is related to U.S. patent application Ser. No. 10/063,501 entitled "Ramp Identification in Adaptive Cruise Control" filed simultaneously herewith and incorporated by reference herein.

BACKGROUND OF INVENTION

1. Technical Field

The present invention relates generally to vehicle adaptive cruise control systems, and more particularly to a method and apparatus for adjusting vehicle speed and inhibiting vehicle resume speed in response to object detection and road curvature.

2. Background of the Invention

Adaptive Cruise Control (ACC) has reached a level of technical and business readiness such that it is beginning to appear in the consumer market as a comfort and convenience system. Consumer technical enthusiasm for ACC has increased because of their interest in intelligent vehicles and systems such as collision warning and collision avoidance. ACC performs as an enhancement to traditional cruise control by automatically adjusting a set speed, which is set by the vehicle operator, to allow a vehicle to adapt to moving traffic.

Under normal driving conditions the ACC system is engaged with a set speed equal to a maximum autonomous speed that is desired by the operator and the ACC system operates in a conventional cruise control mode. When the vehicle approaches traffic, the ACC system automatically adjusts the set speed to follow the traffic at a desired headway distance. When the traffic clears or the vehicle changes lanes the ACC system slowly resumes the speed of the vehicle to the set speed. When the vehicle approaches slow traffic the ACC system is automatically disengaged and the operator manually follows slower vehicles in the slow traffic. When the slow traffic is no longer in front of the vehicle the operator pushes the resume button and the ACC system accelerates the vehicle back to the set speed.

Current ACC systems are unable to reliably classify stopped objects to the degree necessary to actively cause a vehicle to brake in the presence of stopped objects. The stopped objects may be impending when the vehicle is passing a target vehicle or when the vehicle is changing lanes. The current ACC system therefore relies on the operator to stop the vehicle. The stopped object may be another vehicle or some other object. Objects such as bridges, signs, guardrails, and construction barrels that overhang or are near a road edge are also not detected by the ACC system. Since, the ACC system does not detect stopped objects the ACC system may interpret the stopped object as though the road in front of the vehicle is clear and attempt to attain the resume speed. Just as in any cruise control system driver intervention may be required.

As may be expected path prediction of traditional ACC systems generally classifies close objects, less than 50 meters, very well during normal driving conditions in which road curvature is very slow such as highway type roads. However, as the range increases beyond 90 to 100 meters fundamental assumptions of the yaw rate prediction become less statistically valid and may result in misclassifications. As the operated vehicle is following a target vehicle the ACC system radar field may not be continuously directed at the target vehicle, therefore not detecting the target vehicle and begin to accelerate the vehicle. Also "driver hunting" as in transitional maneuvers such as in lane changes and entry and exit conditions become more pronounced. Misclassifying objects is more evident with roadside clutter, which can cause the ACC system to interpret the roadside clutter as in-path targets at longer ranges.

Traditional ACC systems were designed to only react to moving targets presented by normal traffic under extended cruise control operation, thereby, compromising the goals of a collision warning or avoidance system. The current statistical nature of the path prediction in ACC systems can potentially be annoying to the operator of the vehicle by alerting the operator in unnecessary conditions and applying vehicle brakes or accelerating the vehicle in unwarranted situations.

It would therefore be desirable to develop an ACC system that correctly classifies stopped objects. It would also be desirable for the ACC system to correctly classify objects during operation on a curved road. Correctly classifying objects in various road conditions may increase the success of ACC systems in the consumer market and also increase the collision warning capabilities of a vehicle.

SUMMARY OF INVENTION

The forgoing and other advantages are provided by a method and apparatus of adjusting vehicle speed and inhibiting vehicle resume using a control system. A control system for an automotive vehicle is provided including a controller. The controller is electrically coupled to a radar system and a navigation system. The radar system detects an object and generates an object profile. The navigation system generates a navigation signal. The controller in response to the object profile and the navigation signal generates a predicted future path profile and inhibits resume speed of the automotive vehicle in response to the predicted future path profile.

One additional feature of the invention is that the controller may also be electrically coupled to a yaw rate sensor. The yaw rate sensor senses the yaw rate of the vehicle and generates a yaw rate signal. The controller in response to the yaw rate signal inhibits resume speed of the automotive vehicle.

The present invention has several advantages over existing ACC systems. One advantage of the present invention is that it has the ability to decelerate a vehicle upon approaching a stopped object.

Yet another advantage of the present invention is that it prevents false accelerations on curved roads when the radar system may not detect an object in the future path of the vehicle.

Additionally, the present invention prevents automatic resume when a stopped object is in the future path of a vehicle. Therefore, collision avoidance is enhanced by reducing the amount of false automatic resume cycles.

BRIEF DESCRIPTION OF DRAWINGS

For a more complete understanding of this invention reference should now be had to the embodiments illustrated in greater detail in the accompanying figures and described below by way of example.

DETAILED DESCRIPTION

While the present invention is described with respect to an apparatus and method for adaptively adjusting the speed of an automotive vehicle using a control system the following apparatus and method is capable of being adapted for various purposes and is not limited to the following applications: cruise control systems, forward collision warning systems, collision avoidance systems, vehicle systems, or other systems that may require adaptive speed control.

In the following description, various operating parameters and components are described for one constructed embodiment. These specific parameters and components are included as examples and are not meant to be limiting.

Figure 1:
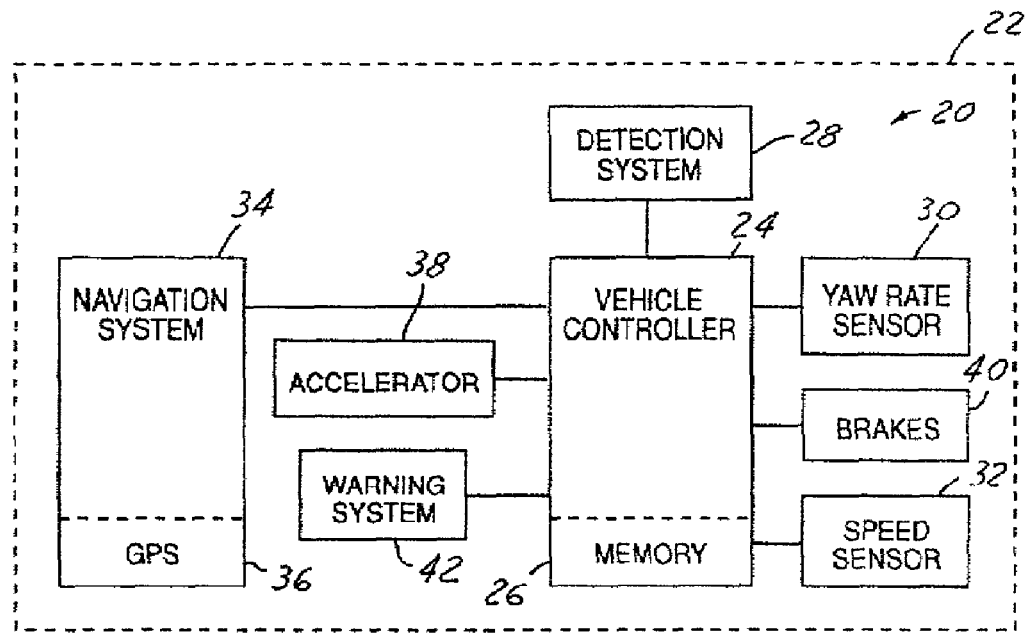
FIG. 1 is a block diagrammatic view of a control system according to an embodiment of the present invention.

Referring now to FIG. 1, a block diagrammatic view of a control system 20 located in an automotive vehicle 22 according to an embodiment of the present invention is shown.

The system 20 includes a vehicle controller 24 that is preferably microprocessor-based. Controller 24 is illustrating having a memory 26 therein for storing information related to vehicle position, object detection, and vehicle characteristics. However, memory 26 may also be a separate component. The controller 24 receives signals from several sensors and systems.

The controller 24 receives a detected object profile from a detection system 28. Although the detection system 28 of the present invention is radar based the detection system 28 may be laser based, infrared based, x-ray based, or based off other detection methods known in the art. The object profile consists of an object location relative to the vehicle 22 and a road the vehicle 22 is being operated on. The object profile also consists of distance between the object and the vehicle 22 and the speed of the object relative to the speed of the vehicle 22.

The controller 24 measures the yaw rate of the vehicle 22 using a yaw rate sensor 30, which represents the level of curvature of a road that the vehicle 22 is being operated on. A curved road may be an entrance ramp, an exit ramp, or other curved road.

The controller 24 also determines the velocity of the vehicle 24 using a speed signal provided by speed sensor 32. Although the speed sensor is illustrated as a single sensor, various numbers of sensors may be employed. A suitable speed sensor employs four sensors located at a respective wheel. The speed of the vehicle may be obtained therefrom in a known way similar to that of an anti-lock braking system.

Additionally, the controller 24 receives a navigation signal from a navigation system 34. The navigation signal includes vehicle position and location as determined by a Global Positioning System 36. The navigation signal may also include but is not limited to: vehicle position, speed category, future vehicle path, landmark location, road curvature, overhead object location, bridge location, construction zone, number of lanes, road type, road inclination, road conditions or other data that may effect whether to adjust the speed of the vehicle.

The controller 24 in response to the object profile, the yaw rate, the speed of the vehicle 22, and the navigation signal determines an operating mode of the system 20. Some of the operating modes are as follows: follow mode, cruise mode, auto resume mode, or inhibit resume mode. Follow mode is when the system 20 is continuously adjusting the speed of the vehicle 22 to remain a headway or predetermined distance from a target vehicle in the future path of the vehicle 22. During cruise mode the system 20 is continuously adjusting the speed of the vehicle 22 to remain at a set speed. During auto resume mode the system 20 is slowly accelerating the vehicle 22 to a set speed. During inhibit resume mode the system 20 is not accelerating the vehicle 22. After determining the system 20 operating mode, the system 20 using the vehicle accelerator 38 or brakes 40 adjusts the speed of the vehicle 22 accordingly. The system 20 may use the vehicle accelerator 38 or may use a mechanical or electrical throttle control device in adjusting the speed of the vehicle 22. The controller 24 may use a warning system 42 to alert the operator of impeding objects in response to the object profile, the yaw rate, the speed at the vehicle, the navigation signal, and the operating mode.

Figure 2A:
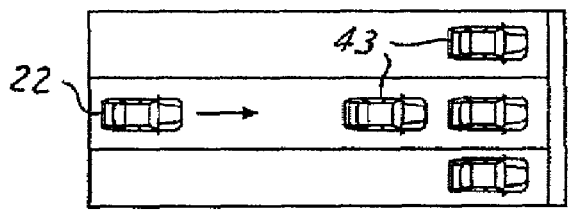
FIG. 2A is a placement diagrammatic view of a stopped object scenario illustrating a vehicle using an adaptive cruise control (ACC) system approaching a series of stopped vehicles.

Referring now to FIG. 2A, a placement diagrammatic view of a stopped object scenario illustrating the vehicle 22 using the system 20 approaching stopped traffic 43 is shown. Unlike current ACC systems, the system 20 of the present invention is able to reliably classify stopped objects for ACC to the degree necessary to actively cause the vehicle 22 to brake in the presence of stopped traffic 43.

Figure 2B:
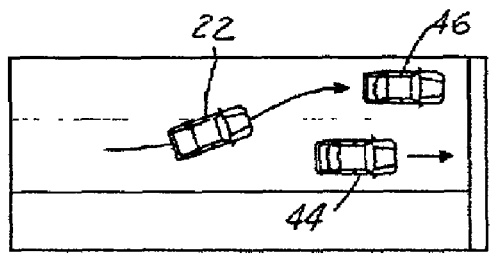
FIG. 2B is a placement diagrammatic view of a stopped object scenario illustrating a vehicle using an ACC system passing a target vehicle and approaching a stopped object.
Figure 2C:
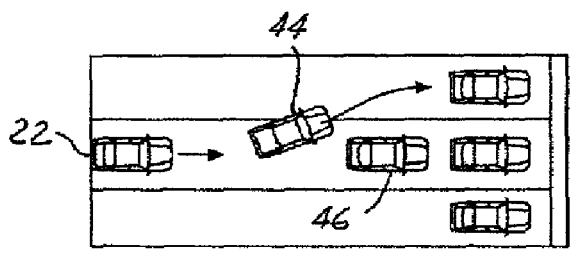
FIG. 2C is a placement diagrammatic view of a stopped object scenario illustrating a vehicle using an ACC system tracking a target vehicle that is switching lanes and approaching a stopped object.

Referring now to FIGS. 2B and 2C, a moving target 44 is either being passed or is changing lanes and reveals a stopped object 46. The stopped object 46 may be another vehicle 46, as shown, or some other object. The vehicle 22 is moving at speeds below a set speed, as the vehicle 22 approaches and detects the stopped object 46. The system 20, using brakes 40, reduces the speed of the vehicle 22 as to remain a headway distance from the pending stopped object 46 in contrast to current systems that may not detect the stopped object and proceed to auto resume mode.

Figure 3:
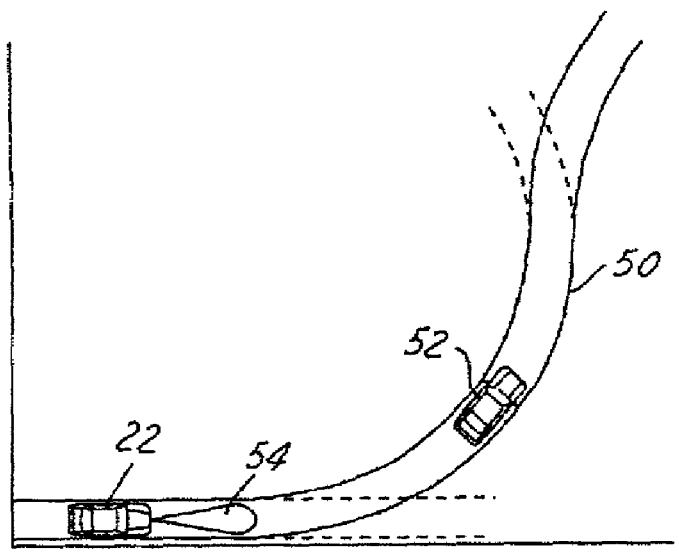
FIG. 3 is a placement diagrammatic view of a vehicle operating on a curved road and utilizing a control system in accordance with an embodiment of the present invention.

Referring now to FIG. 3, an example of vehicle 22 operating on a curved road 50 following a target vehicle 52 and utilizing an system 20 in accordance with an embodiment of the present invention in shown. The controller 24, using the yaw rate sensor 30, measures the present rate of curvature of the road 50 and assumes that the curvature of the road 50 to follow is curving at the same rate. Other road conditions including speed category, number of lanes, or road inclination may also be assumed to remain constant. Note the navigation system 34 may be utilized to provide a more accurate future road path prediction. As the target vehicle 52 moves out of the radar beam 54, the system 20 stops detecting the target vehicle 52 and instead of resuming to a set speed, the controller 24 inhibits resume speed of the vehicle and maintains a hold speed equal to the present driving speed until the yaw rate is below a predetermined value in inhibit resume mode. Inhibit resume mode, as described above, allows the vehicle to reasonably predict straight roads and steady state curves. However, during transitional maneuvers such as entry and exits into curves and lane changes, the projected path of the vehicle 22 is likely to be inaccurate. On the other hand, since transitional maneuvers are only relatively short in duration, the inaccuracies do not result in radical behavior of the system 20 but may lead to momentary accelerations which may again be minimized or removed by utilizing the navigation system 34 as described above.

Figure 4:
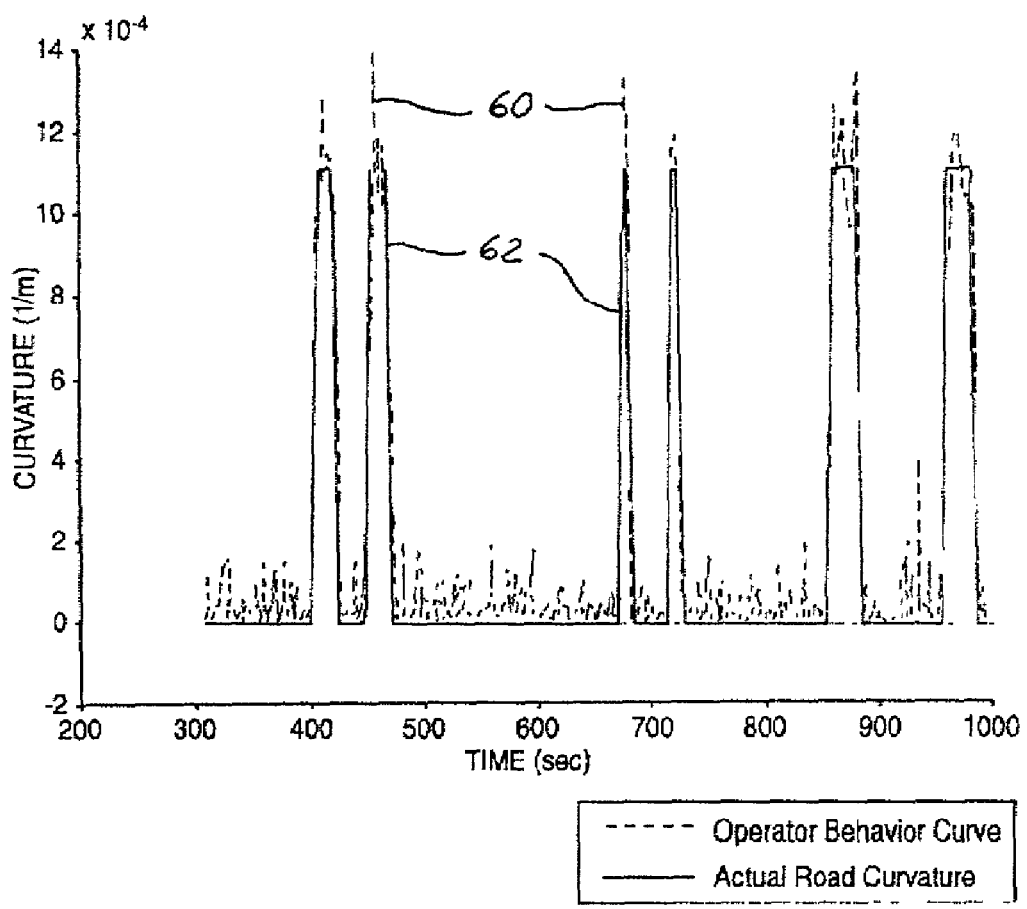
FIG. 4 is a graph representing an example of operator behavior, which in overall closely reflects road geometry according to the present invention.

Referring now to FIG. 4, a graph representing an example of operator behavior, which overall closely reflects road geometry according to the present invention, is shown. Vehicle operators tend not to follow a road's true shape, which is referred to as "driver hunting", and create their own driving pattern represented by curve 60 for various reasons. The deviation from the road's true shape in addition to driver hunting directly effects the yaw rate and estimated curvature prediction of the system 20. Although, at any instant in time, the yaw rate measured may not accurately represent the actual road curvature, on average, the driving pattern statistically reflects the geometry of the road represented by curve 62. The controller 24 accommodates for the measured yaw rate inaccuracies by, as stated above, suspending or inhibiting the automatic resume function of the system 20 when the yaw rate is above a predetermined value, which corresponds to a lateral acceleration threshold. The lateral acceleration that automatically inhibits resume speed of the vehicle is computed according to:

$$a_{lat}=u*r$$

where u is vehicle speed and r is yaw rate. A lookup table may be also used to determine the lateral acceleration threshold in response to vehicle speed and yaw rate. The resulting lateral acceleration threshold is used to limit vehicle acceleration in resume mode. Therefore, the system 20 holds a steady state through the curvature in the road when the target vehicle 52 is no longer detected. Since operators prefer not to accelerate on curved stretches of road, the system 20 is predictable in that it maintains a hold speed throughout the curve, thereby, providing comfort for the operator.

Figure 5:
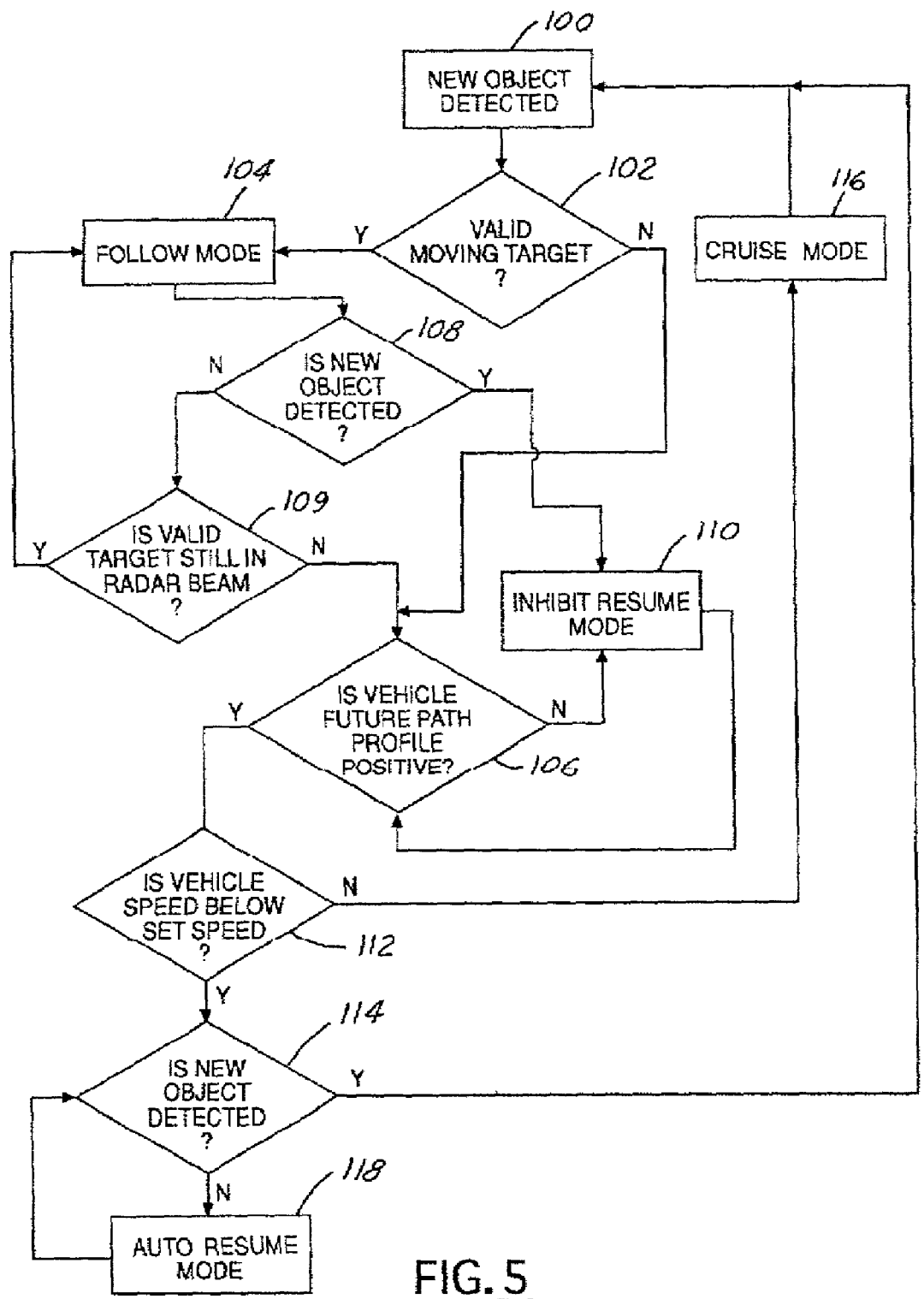
FIG. 5 is a flow chart illustrating a method of adaptively adjusting vehicle speed in accordance with an embodiment of the present invention.

Referring now to FIG. 5, a flow chart illustrating a method of adaptively adjusting vehicle speed in accordance with an embodiment of the present invention is shown. The primary reason for introducing stopped objects into the system 20 is the desire to evolve the system 20 towards having collision warning functionality.

In step 100, the system 20 detects a "new" object in the radar beam 54. The controller 24 behaves conservatively until a potential threat is statistically classified as real or a false alarm. The system 20 is continuously adjusting the speed of the vehicle 22 as to maintain a safe operating distance from an object in the future path of the vehicle 22. The object may be but not limited to: a vehicle, a stopped object, a moving object, a bridge, construction equipment, a sign, an animate or inanimate object, or other object. The system 20 proceeds to step 102 when an object has been detected.

In step 102, the controller 24 determines whether the object is a valid moving target (another moving vehicle). If the object is a valid moving target step 104 is performed. In step 104, the system 20 is operating in follow mode. During follow mode the system 20 is continuously adjusting the speed of the vehicle 22 as to maintain a predetermined distance from the target vehicle in the future vehicle path of vehicle 22. Of course, the maximum speed the system 20 accelerates the vehicle 22 to during follow mode is the set speed. The controller 24 continues to step 108 simultaneously while maintaining follow mode operation. In step 108, the controller 24 monitors the radar beam 54 for a new object. When a new object is detected step 110 is performed, to inhibit resume speed of the vehicle 22, otherwise the controller 24 proceeds to step 109. Step 108 and step 109 are performed iteratively with step 104. The controller 24 while maintaining follow mode continues to step 109 when a new object is not detected. In step 109, the controller 24 determines whether the valid target is still in the radar beam 54. While the target vehicle is in the radar beam 54 the system 20 remains in follow mode, unless a new object is detected or the yaw rate is above a predetermined value, otherwise the controller 54 performs step 106.

Referring back to step 102 if a valid moving object is not detected or a valid target is not in the beam in step 109 then step 106 is performed. In step 106, the controller 24 determines whether the future path profile of the vehicle 22 is positive. The future path profile may include the following information: object profile, yaw rate, street category, upcoming future road paths or other related information. In order for the future path profile of the vehicle 22 to be positive, the system 20 no longer detects an object in the future path of the vehicle 22 and the yaw rate is below a predetermined value. When an object is detected in radar beam 54, the controller 24 determines whether the object is a moving object or a stopped object, the location of the object relative to the vehicle, and adjusts the speed of the vehicle accordingly. Note the controller 24 may use the object profile to not only determine the location of the object but also to determine whether the object is a potential hazard such that step 110 should be performed. When the object is small and insignificant and the yaw rate is below a predetermined value, the future path profile is positive, step 112 is performed. In step 110, the system 20 inhibits resume speed of the vehicle 22 to the set speed. This is referred to as inhibit resume mode. The vehicle 22 may maintain a hold speed as on a curved road or may decelerate the vehicle 22 to prevent the vehicle 22 from colliding with the detected object. Deceleration due to false object detection using the present invention may occur only for small changes in throttle command, which are effectively filtered out by the inertia of the vehicle 22 and therefore not noticed by the operator. The controller 24 may use the warning system 42 to alert the operator of the impeding object. The warning system 42 allows the operator to have ample time to react when necessary. The controller 24 continuously returns to step 106 to monitor whether the vehicle 22 future path profile is positive or negative. The controller 24 remains in inhibit resume mode while the vehicle future path profile is negative.

Referring again to step 106, when the future path profile is positive step 112 is performed. In step 112, the controller 24 compares the present vehicle speed with the set speed. When the present vehicle speed is less than the set speed, step 114 is performed, otherwise step 116 is performed. In step 116, the system 20 is operating in cruise mode. During cruise mode the controller 24 is operating the vehicle 22 at a maintained velocity equal to the set speed. During cruise mode as with other modes of operation the system 20 is continuously monitoring the future path of the vehicle 22 for new objects, which would cause the controller 24 to return to step 100. Of course, cruise mode may be canceled manually by the operator as known in the art.

Referring again to step 112, when the present vehicle speed is less than the set speed, step 114 is performed. In step 114, the controller 24 determines whether a new object has been detected. When a new object has been detected the controller 24 returns to step 100 otherwise step 118 is performed. In step 118, the system 20 is operating in auto resume mode when the vehicle speed is below a set speed and a new object is not detected. During auto resume mode the controller 24 slowly accelerates the vehicle 22 to the set speed. The controller is continuously returning to step 112 until the present vehicle velocity is equal to the set speed or a new object is detected in step 114.

Implementation of inhibit resume mode during object detection and road curvature provides an additional safety enhancement to traditional cruise control systems. The present invention introduces stopped objects and situational awareness information into a control system in a useful manner that enhances operator comfort and safety without detracting from current performance standards.

The above-described method, to one skilled in the art, is capable of being adapted for various purposes and is not limited to the following applications: cruise control systems, forward collision warning systems, collision avoidance systems, vehicle systems, or other systems that may require adaptive speed control. The above-described invention may also be varied without deviating from the true scope of the invention.

What is claimed is:

1. A method of adaptively controlling the speed of an automotive vehicle having a controller comprising:
   detecting an object and generating an object profile;
   generating a navigation signal via a navigation system;
   predicting a non-planned future pat of the automotive vehicle in response to said navigation signal;
   generating a predicted future path profile via the controller in response to said non-planned future path and said object profile; and
   inhibiting a resume speed of the automotive vehicle by preventing acceleration of the automotive vehicle in response to said predicted future path profile and a command originated and generated by the controller.

2. A method as in claim 1 further comprising continuously updating said predicted future path profile.

3. A method as in claim 2 wherein updating said predicted future path profile includes updating parameters selected from the following group comprising object profile, yaw rate, street category, and upcoming future road paths.

4. A method as in claim 1 further comprising:
   determining that said object is a stopped object;
   adjusting automotive vehicle speed in relation to said stopped object; and
   maintaining a safe operating distance between the automotive vehicle and said stopped object.

5. A method as in claim 1 further comprising assuming a future road condition selected from the following group comprising: road curvature, speed category, number of lanes, and road inclination is the same as a present road condition.

6. A method as in claim 1 wherein predicting the non-planned future path of the automotive vehicle comprises:
   sensing yaw rate of the automotive vehicle and generating a yaw rate signal;
   relating said yaw rate to road curvature; and
   inhibiting resume speed of the automotive vehicle in response to said yaw rate signal.

7. A method as in claim 1 wherein predicting the non-planned future path of the automotive vehicle comprises using a navigation system to generate a navigation signal including information selected from the following group comprising; automotive vehicle position, speed category, future path of the automotive vehicle, landmark location, road curvature, overhead object location, bridge location, construction zone, number of lanes, road type, and road inclination.

8. A method as in claim 1 wherein generating an object profile comprises storing object parameters selected from the following list comprising: relative distance from the automotive vehicle, object location relative to a road, and velocity of said object relative to the automotive vehicle velocity.

9. A method as in claim 1 wherein generating a predicted future path profile further comprises determining object location with respect to the non-planned future path.

10. A method as in claim 1 wherein inhibiting the resume speed of the automotive vehicle further comprises inhibiting resume speed of the automotive vehicle while a present parameter selected from the following group comprising: road curvature, speed category, number of lanes, and road inclination remains constant.

11. A method of adaptively controlling the speed of an automotive vehicle having a controller comprising:
    detecting an object and generating an object profile;
    predicting a non-planned future path of the automotive vehicle and generating a predicted future path profile via the controller;
    assuming a future road condition to be the same as a present road condition;
    sensing yaw rate of the automotive vehicle;
    generating a yaw rate signal; and
    inhibiting a resume speed of the automotive vehicle by preventing acceleration of the automotive vehicle in response to said object profile, said assumption, said predicted future path profile, said yaw rate signal and a command originated and generated by the controller.

12. A method as in claim 11 wherein predicting a non-planned future path of the automotive vehicle is in response to a navigation signal.

13. A method as in claim 11 further comprising adjusting the automotive vehicle speed in response to said object profile and said predicted future path profile to avoid a stopped object.

14. A method as in claim 11 further comprising signaling a warning system in response to said object profile and said predicted future path profile.

15. A control system for an automotive vehicle comprising:
    a detection system detecting an object, said detection system generating a object profile;
    a navigation system generating a navigation signal; and
    an in-vehicle controller electrically coupled to said detection system and said navigation system, said controller in response to said object profile and said navigation signal, generating a predicted future path profile and inhibiting resume speed of the automotive vehicle by preventing acceleration of the automotive vehicle in response to said predicted future path profile and a command originated and generated by the controller.

16. A system as in claim 15 wherein said controller in generating a predicted future path profile determines an object location with respect to the non-planned future path.

17. A system as in claim 5 wherein said controller determines said object to be a stopped object and adjusts the speed of the automotive vehicle in relation to said stopped object.

18. A control system for an automotive vehicle comprising:
- a radar system detecting an object, said radar system generating an object profile;
- a navigation system generating a navigation signal;
- a yaw rate sensor sensing yaw rate of the automotive vehicle, said yaw rate sensor generating a yaw rate signal; and
- an in-vehicle controller electrically coupled to said radar system, said navigation system, and said yaw rate sensors said controller in response to said object profile and said navigation signal generating a predicted future path profile and inhibiting resume speed of the automotive vehicle by preventing acceleration of the automotive vehicle in response to said predicted future path profile, said yaw rate signal, and a command originated and generated by the controller.

* * * * *